United States Patent
Yamasaki

(10) Patent No.: US 11,163,290 B2
(45) Date of Patent: *Nov. 2, 2021

(54) CONTROL DEVICE AND AXIAL FEED CONTROL METHOD

(71) Applicant: FANUC CORPORATION, Yamanashi (JP)

(72) Inventor: Mizuho Yamasaki, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 85 days.

This patent is subject to a terminal disclaimer.

(21) Appl. No.: 16/541,722

(22) Filed: Aug. 15, 2019

(65) Prior Publication Data

US 2020/0064807 A1 Feb. 27, 2020

(30) Foreign Application Priority Data

Aug. 22, 2018 (JP) ............................. JP2018-155586

(51) Int. Cl.
*G05B 19/402* (2006.01)
(52) U.S. Cl.
CPC .. *G05B 19/402* (2013.01); *G05B 2219/50048* (2013.01)
(58) Field of Classification Search
CPC .................. G05B 19/402; G05B 2219/50048
See application file for complete search history.

(56) References Cited

U.S. PATENT DOCUMENTS

| 6,233,497 | B1 | 5/2001 | Kachi et al. |
| 6,549,824 | B1 | 4/2003 | Satou et al. |
| 7,292,354 | B2 | 11/2007 | Schrammli et al. |
| 2005/0068290 | A1* | 3/2005 | Jaeger ................. G06F 3/04845 345/156 |
| 2005/0115928 | A1 | 6/2005 | Arakawa et al. |
| 2007/0288124 | A1 | 12/2007 | Nagata et al. |
| 2014/0306993 | A1* | 10/2014 | Poulos .................. G06T 19/006 345/633 |

(Continued)

FOREIGN PATENT DOCUMENTS

| CN | 104035379 B | 1/2017 |
| CN | 103900805 B | 7/2017 |
| CN | 107479385 A | 12/2017 |

(Continued)

OTHER PUBLICATIONS

Office Action issued by the United States Patent Office in relation to U.S. Appl. No. 16/541,792 dated Mar. 12, 2021 (35 pages).

*Primary Examiner* — Gary Collins
(74) *Attorney, Agent, or Firm* — Robert P. Michal, Esq.; Carter, DeLuca & Farrell LLP

(57) ABSTRACT

A control device includes: an input unit; a motor driving control unit; an amount-of-movement detecting unit; a coordinate position detecting unit; a display unit; and a rounding processing unit configured to perform rounding processing to round the coordinate position and the amount of movement of an object to be moved, to a rounding place corresponding to an axial feed rate. The motor driving control unit drives motors such that at least one of the coordinate position and the amount of movement of the moved object is rounded.

12 Claims, 6 Drawing Sheets

(56) References Cited

U.S. PATENT DOCUMENTS

2015/0234373 A1\* 8/2015 Myers .................. G05B 19/409
                                                                                         700/170
2020/0064807 A1 2/2020 Yamasaki

FOREIGN PATENT DOCUMENTS

| CN | 107796392 A | 3/2018 |
|---|---|---|
| JP | H05282047 A | 10/1993 |
| JP | H06102922 A | 4/1994 |
| JP | H07251350 A | 10/1995 |
| JP | 2005-153128 A | 6/2005 |
| JP | 2013097413 A | 5/2013 |
| TW | 201805127 A | 2/2018 |

\* cited by examiner

FIG. 6

| AXIAL FEED RATE | CORRESPONDING ROUNDING PLACE |
|---|---|
| "SUPERHIGH" | THE ONES PLACE |
| "HIGH" | THE TENTHS PLACE |
| "INTERMEDIATE" | THE HUNDREDTHS PLACE |
| "LOW" | THE THOUSANDTHS PLACE |
| "SLOW" | THE TEN-THOUSANDTHS PLACE |

CONTROL DEVICE AND AXIAL FEED CONTROL METHOD

CROSS-REFERENCE TO RELATED APPLICATION

This application is based upon and claims the benefit of priority from Japanese Patent Application No. 2018-155586 filed on Aug. 22, 2018, the contents of which are incorporated herein by reference.

BACKGROUND OF THE INVENTION

Field of the Invention

The present invention relates to a control device and an axial feed control method for controlling a motor in a machine tool in which axial feed of an object to be moved is performed by the driving of the motor.

Description of the Related Art

"Continuous axial feed" (also called "jog feed (manual continuous feed)") is known as a method for axial feeding in machine tools etc. As a machine tool adopting this method, for example, a wire electric discharge machine is described in Japanese Laid-Open Patent Publication No. 2005-153128.

In the continuous axial feed, the motor for axial feed of an object to be moved (also referred to as a moved object) is driven based on the designation of an axial feed rate and an axial feed operation performed by an operator from an input unit. As the motor is driven, the object to be moved advances on a coordinate system at the designated rate along the axial feed direction until the axial feed operation is stopped. In this case, the operator performs the axial feed operation while monitoring the coordinate position and the amount of movement of the moved object displayed on a display unit.

SUMMARY OF THE INVENTION

However, when the operator intends to move the object to a desired position, the timing that the operator stops the axial feed operation (i.e., releases the operation key) may vary. This causes variation of the position at which the object stops. Particularly, there is a tendency that the error between the desired stopping position and the actual stopping position is larger when the axial feed rate is faster.

Accordingly, an object of the present invention is to provide a control device and an axial feed control method in which variations in the stopping position and the amount of movement of an object to be moved are suppressed even when the timing that an operator releases the axial feed operation varies.

A first aspect of the present invention is directed to a control device configured to control a motor for performing axial feed of a moved object. The control device includes: an input unit configured to allow an operator to perform an axial feed operation and specify an axial feed rate; a motor driving control unit configured to drive the motor such that the moved object moves at the specified axial feed rate only while the axial feed operation is being performed by the operator; an amount-of-movement detecting unit configured to detect an amount of movement of the moved object in an axial feed direction; a coordinate position detecting unit configured to detect, based on the amount of movement, a coordinate position of the moved object in the axial feed direction on a predetermined coordinate system; a display unit configured to display at least the coordinate position; and a rounding processing unit configured to perform rounding processing for rounding, to a rounding place corresponding to the specified axial feed rate, at least one of the coordinate position and the amount of movement of the moved object at a time when the axial feed operation is stopped by the operator. The motor driving control unit is further configured to drive the motor such that at least one of the coordinate position and the amount of movement of the moved object is rounded based on a result of the rounding processing.

According to a second aspect of the present invention, an axial feed control method includes the steps of: setting either of a coordinate position and an amount of movement of a moved object as an object of rounding processing; in accordance with specifying of an axial feed rate and performing of an axial feed operation by an operator, driving a motor such that the moved object moves on a coordinate system at the specified axial feed rate; at a time when the axial feed operation is stopped, obtaining a numerical value of the object of the rounding processing at that time; determining a rounding place corresponding to the axial feed rate based on a predetermined correspondence relation; calculating a rounded numerical value by performing the rounding processing for rounding the numerical value of the object of the rounding processing to the rounding place; and driving the motor such that an actual numerical value of the object of the rounding processing agrees with the rounded numerical value.

According to the present invention, at least one of the coordinate position and the amount of movement of the moved object is rounded to the rounding place that is determined in correspondence with the axial feed rate specified by the operator. Accordingly, occurrence of variation in the stopping position and the amount of movement of the moved object is suppressed even when the timing that the operator stops the axial feed operation varies.

Further, according to the present invention, the rounding place is determined in correspondence with the axial feed rate. It is thus possible to round the error between the desired stopping position and the actual stopping position of the moved object to a value corresponding to the axial feed rate.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 6 is a correspondence table showing an example of a relation between axial feed rates and rounding places that is stored in a memory of the control unit of the first embodiment.

DESCRIPTION OF THE PREFERRED EMBODIMENTS

The control device and axial feed control method according to the present invention will now be described in detail in conjunction with preferred embodiments while referring to the accompanying drawings.

Configuration of First Embodiment

Figure 1:
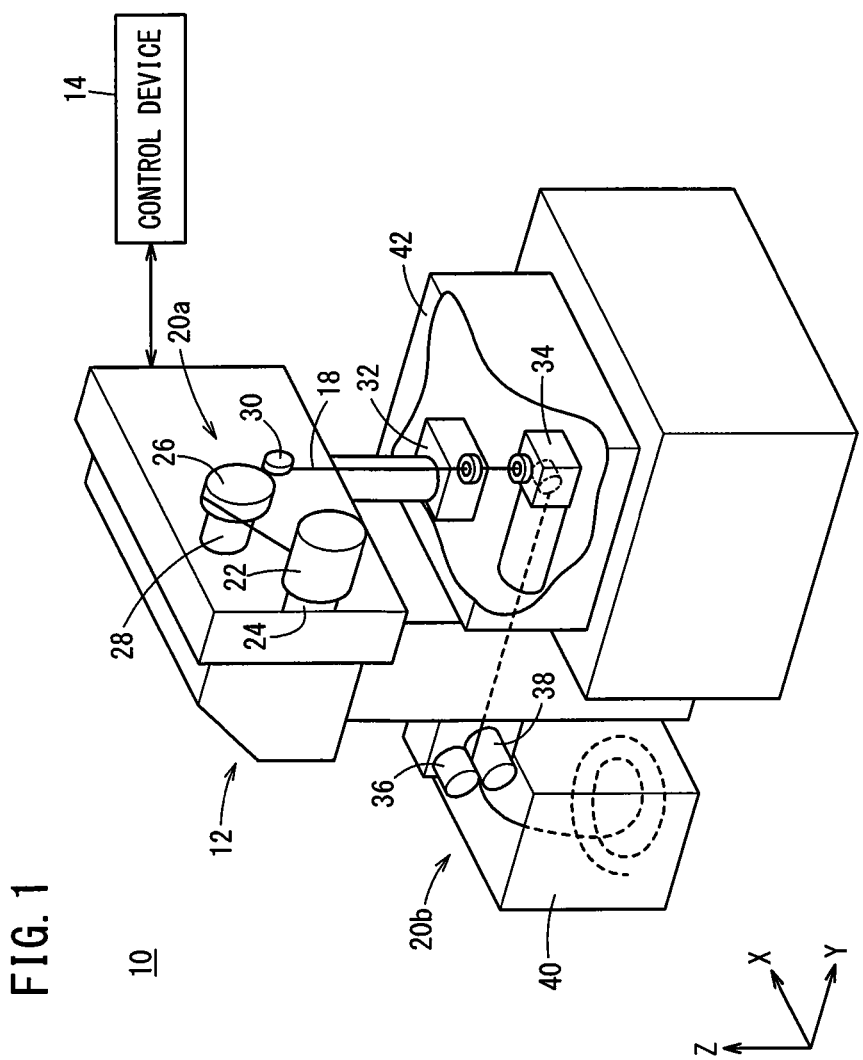
FIG. 1 is a perspective view showing an example configuration of a machine tool having a control device according to a first embodiment.

FIG. 1 is a perspective view showing an example configuration of a machine tool 10 having a control device 14 according to a first embodiment. As shown in FIG. 1, the machine tool 10 is a wire electric discharge machine, for example, and includes a main body 12 and the control device 14.

First, the main body 12 will be described. The main body 12 includes a supplying system 20a for supplying a wire electrode 18 to an object 16 to be moved (which will also be referred to as a moved object 16) (see FIG. 2), a collecting system 20b for collecting the wire electrode 18 passed through the object 16 to be moved, and a tank (pan) 42 in which a dielectric working fluid is stored.

The supplying system 20a includes a wire bobbin 22, a brake shoe 26, a brake motor 28, and an upper wire guide 32. The wire electrode 18 is wound around the wire bobbin 22 and torque is applied to the bobbin by a torque motor 24. The brake shoe 26 applies a braking force by friction to the wire electrode 18 and brake torque is applied to the brake shoe by the brake motor 28. The upper wire guide 32 is disposed in the tank 42 and guides the wire electrode 18 above the moved object 16. The supplying system 20a further includes a tension detector 30 for detecting the magnitude of tension of the wire electrode 18, and so on.

The collecting system 20b includes a lower wire guide 34, a pinch roller 36, a feed roller 38, and a wire collection box 40. The lower wire guide 34 is disposed in the tank 42 and guides the wire electrode 18 below the moved object 16. The pinch roller 36 and feed roller 38 are disposed to pinch and convey the wire electrode 18, and the conveyed wire electrode 18 is collected into the wire collection box 40. The wire electrode 18 is conveyed along a Z-axis direction with respect to the moved object 16 by the upper wire guide 32 and the lower wire guide 34.

In the machine tool 10 having the main body 12 described above, the moved object 16 is supported on a supporting portion 44 such as a table (see FIG. 2) in the working fluid in the tank 42, and a voltage is applied to the gap formed between the wire electrode 18 and the moved object 16. An electric discharge thus occurs in the working fluid and electric discharge machining is performed on the moved object 16. The supporting portion 44 is capable of moving in an X-axis direction and a Y-axis direction that cross the Z-axis direction. The moved object 16 is thus three-dimensionally machined as the supporting portion 44 moves in the X-axis direction and Y-axis direction. The upper wire guide 32 is capable of moving in a U-axis direction parallel to the X-axis direction and a V-axis direction parallel to the Y-axis direction.

Next, the control device 14 will be described below. The control device 14 is configured to control axial feed of the moved object 16 (supporting portion 44) when the axial feed operation explained above is performed.

Figure 2:
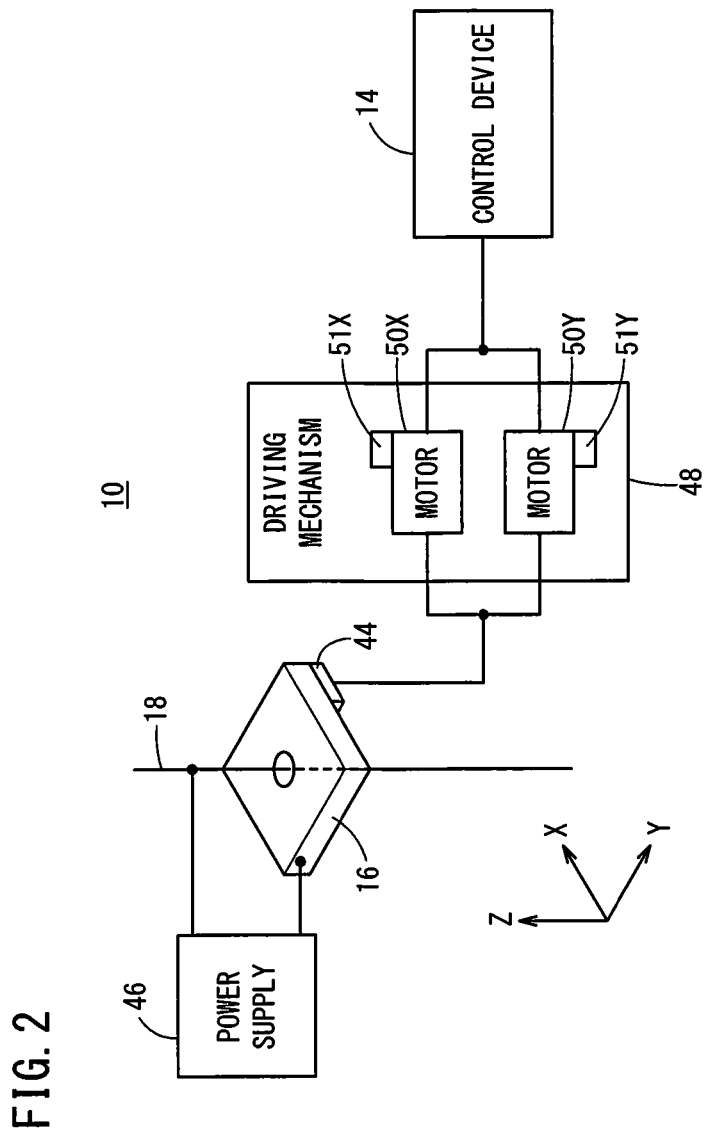
FIG. 2 is a block diagram showing a schematic configuration of the machine tool having the control device of the first embodiment.

FIG. 2 is a block diagram showing a schematic configuration of the machine tool 10 having the control device 14 of the first embodiment.

As shown in FIG. 2, a power supply 46 is connected to the wire electrode 18 and the supporting portion 44 of the machine tool 10 to apply voltage thereto. The control device 14 and the supporting portion 44 are connected to each other through a driving mechanism 48.

The driving mechanism 48 is configured to move the supporting portion 44 and includes motors 50X, 50Y for driving the supporting portion 44 respectively in the X-axis direction and the Y-axis direction on a predetermined coordinate system. That is, in this embodiment, the supporting portion 44 and the moved object 16 on the supporting portion 44 move as the motors 50X, 50Y rotate. The rotations of the motors 50X, 50Y are controlled by the control device 14. Further, the motors 50X, 50Y respectively include encoders 51X, 51Y for measuring the respective rotational angles.

The predetermined coordinate system may be a mechanical coordinate system that is determined at the designing stage of the machine tool 10 or a coordinate system in which an operator sets the origin in an arbitrary manner. In this embodiment, in order to simplify the description, the predetermined coordinate system will be explained as a mechanical coordinate system that is determined at the designing stage of the machine tool 10.

Figure 3:
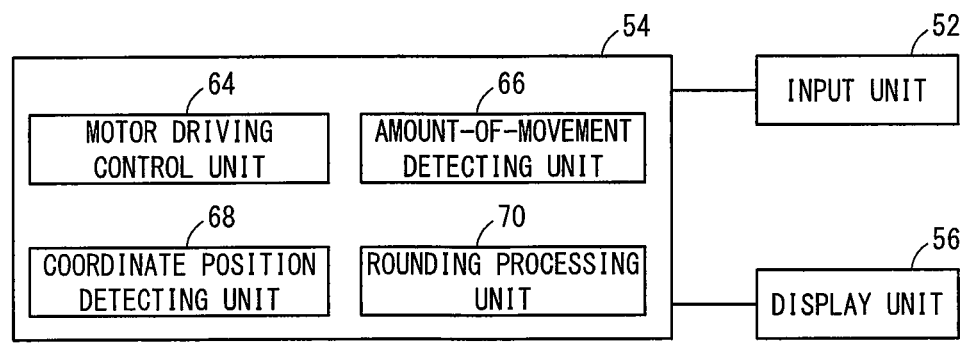
FIG. 3 is a block diagram showing a schematic configuration of the control device of the first embodiment.

FIG. 3 is a block diagram showing a schematic configuration of the control device 14 of the first embodiment. As shown in FIG. 3, the control device 14 includes an input unit 52, a control unit 54, and a display unit 56.

Figure 4:
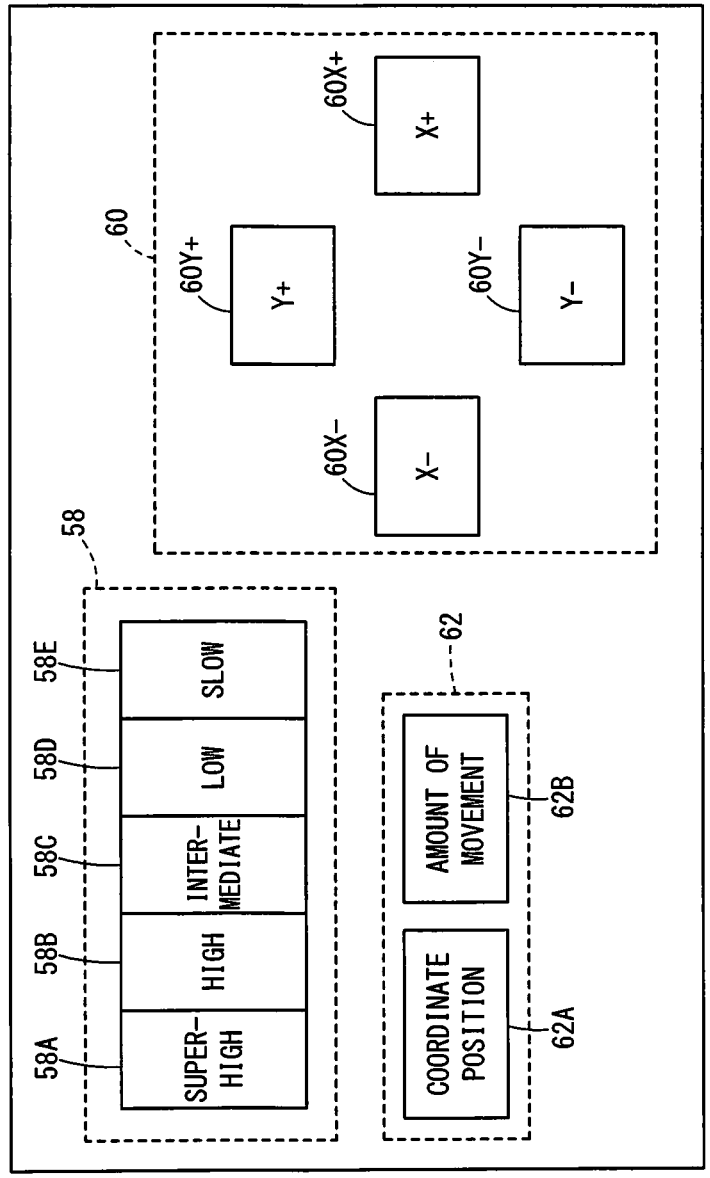
FIG. 4 is a diagram schematically showing an arrangement of operation keys on an input unit of the first embodiment.

FIG. 4 is a diagram schematically showing an example of arrangement of operation keys on the input unit 52 of the first embodiment.

The input unit 52 is an operation panel, for example, and configured to allow an operator to perform an axial feed operation and specify an axial feed rate. As shown in FIG. 4, the input unit 52 includes a plurality of rate selecting keys 58 (58A to 58E) by which the operator can specify an axial feed rate. The rate selecting key 58A corresponds to "superhigh" and the rate selecting key 58B corresponds to "high". Similarly, the rate selecting keys 58C, 58D and 58E correspond to "intermediate", "low" and "slow", respectively.

The input unit 52 further includes a plurality of axial feed keys 60 (60X+, 60X−, 60Y+, 60Y−) by which the operator specifies an axial feed of the moved object 16. The operation of the axial feed keys 60X+, 60X−, 60Y+, 60Y− by the operator is referred to as an axial feed operation. For example, the operator operates the axial feed key 60X+ to move the moved object 16 (supporting portion 44) in the +X-axis direction and operates the axial feed key 60X− to move the moved object 16 in the −X-axis direction. Similarly, the operator operates the axial feed key 60Y+ to move the moved object 16 (supporting portion 44) in the +Y-axis direction and operates the axial feed key 60Y− to move the moved object 16 in the −Y-axis direction.

The input unit 52 further includes two object-to-be-rounded selecting keys 62 (62A, 62B) for allowing the operator to select either of the coordinate position and the amount of movement as an object of rounding processing that will be described later. When selecting the coordinate position as the object to be rounded (i.e., target for rounding), the operator operates the object-to-be-rounded selecting key 62A. When selecting the amount of movement as the object to be rounded, the operator operates the object-to-be-rounded selecting key 62B.

The "coordinate position" in this embodiment indicates a position at which the moved object 16 exists on the predetermined coordinate system. Further, the "amount of movement" in this embodiment indicates a distance that the moved object 16 travels on the predetermined coordinate system from the start of an axial feed operation to its stopping.

The display unit 56 is a liquid-crystal display, for example, and configured to display at least the coordinate position of the moved object 16. The information displayed on the display unit 56 may be changed as needed. For example, the display unit 56 may be configured to display not only the coordinate position but also the amount of movement and the axial feed rate.

The control unit 54 includes a processor and memory (not shown) and is configured to execute programs required to control the machine tool 10. For example, when one of the rate selecting keys 58A to 58E is operated, the control unit 54 sets the axial feed rate at the rate corresponding to the operated rate selecting key 58. For example, when the rate selecting key 58A is operated, the control unit 54 sets the axial feed rate at "superhigh". While the specific rates at the respective levels may be changed appropriately, this embodiment assumes that the axial feed rate is set to be fastest when "superhigh" is specified and that the axial feed rate is set to be slowest when "slow" is specified.

As shown in FIG. 3, in this embodiment, the control unit 54 includes a motor driving control unit 64, an amount-of-movement detecting unit 66, a coordinate position detecting unit 68, and a rounding processing unit 70.

The motor driving control unit 64 is a processing unit that is configured to drive the motors 50X, 50Y to move the moved object 16 until an axial feed operation conducted by an operator is stopped, and based on the result of rounding processing, which will be described later, if the rounding processing is performed. For example, in this embodiment, when the axial feed key 60X+ is operated, the motor driving control unit 64 drives the motor 50X so that the moved object 16 moves at the set axial feed rate in the +X-axis direction until the operation is stopped (i.e., until the operation key is released). Also, when the axial feed key 60X− is operated, the motor driving control unit 64 drives the motor 50X so that the moved object 16 moves at the set axial feed rate in the −X-axis direction until the operation is released. Similarly, when the axial feed key 60Y+ or 60Y− is operated, the motor driving control unit 64 drives the motor 50Y according to the operation.

The amount-of-movement detecting unit 66 is a processing unit that is configured to detect the amount of movement of the moved object 16 in the axial feed direction. In this embodiment, the amount-of-movement detecting unit 66 detects the amount of movement of the moved object 16 in the axial feed direction based on the rotational angles of the motors 50X, 50Y measured by the encoders 51X, 51Y. When the machine tool 10 includes a sensor or the like that is capable of detecting the amount of movement of the moved object 16, the amount-of-movement detecting unit 66 does not have to employ information from the encoders 51X, 51Y.

Based on the amount of movement of the moved object 16 detected by the amount-of-movement detecting unit 66, the coordinate position detecting unit 68 detects the coordinate position of the moved object 16 in the axial feed direction. In this embodiment, the amount of movement and the coordinate position are both detected as a numerical value having four decimal places in millimeters (mm), but the unit and the number of places of the numerical values to be detected may be changed appropriately.

The rounding processing unit 70 is a processing unit that is configured to perform rounding processing for rounding at least one of the coordinate position and the amount of movement of the moved object 16 at the time when the axial feed operation is stopped (i.e., the operation key is released) by the operator to a rounding place that corresponds to the specified axial feed rate.

In this embodiment, when the operator operates either of the object-to-be-rounded selecting keys 62A and 62B, then the corresponding one of the coordinate position and the amount of movement of the moved object 16 is set as the object of the rounding processing in the rounding processing unit 70, in response to the operation. The rounding processing unit 70 performs the rounding processing by rounding up at least one of the numerical values of the object to be rounded (the coordinate position or the amount of movement) obtained at the time when the axial feed operation is stopped by the operator, to the rounding place such that the figures after the rounding place become zero.

The axial feed rate and the object to be rounded may be set by instructions from the operator, or may be set automatically by the control unit 54 as initial settings at startup of the machine tool 10, for example.

Figure 5:
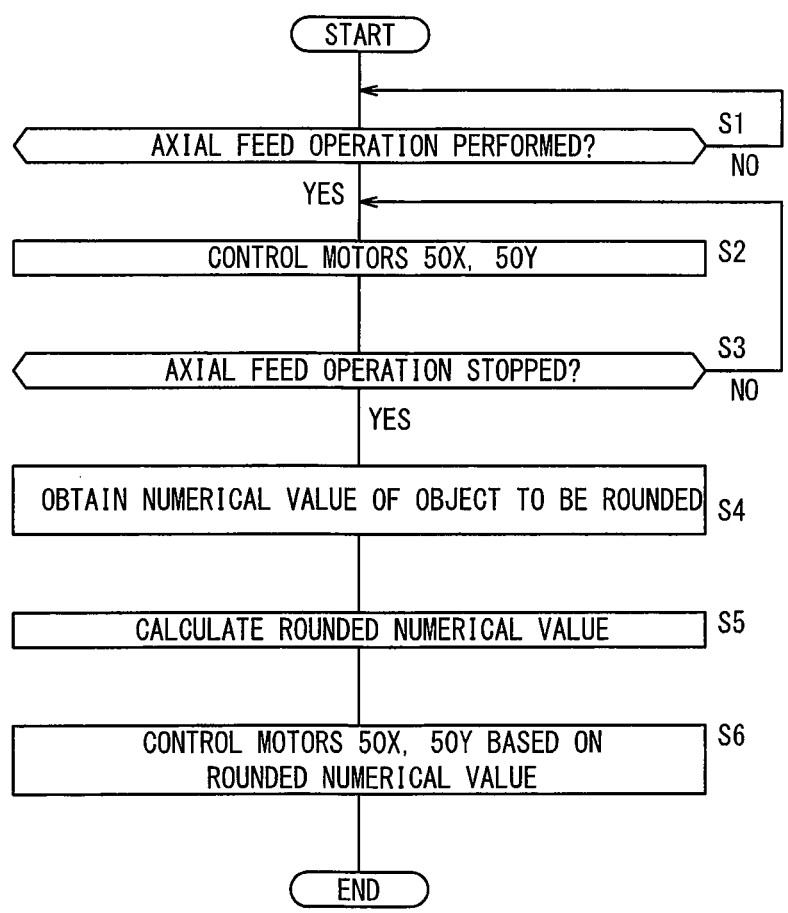
FIG. 5 is a flowchart showing the flow of a control performed by a control unit in a process in which rounding processing of the first embodiment is performed.

FIG. 5 is a flowchart showing the flow of a control performed by the control unit 54 in a process including the rounding processing.

First, at step S1, the control unit 54 determines whether an axial feed operation is being performed. For example, the control unit 54 determines that an axial feed operation is being performed when it receives a signal that is sent from the input unit 52 when any of the axial feed keys 60X+ to 60Y− is operated. Then, if the control unit 54 determines that an axial feed operation is being performed, it executes steps S2 and S3.

At steps S2 and S3, the control unit 54 controls the motors 50X, 50Y by the motor driving control unit 64 until the axial feed operation is stopped.

When the axial feed operation is stopped (i.e., when the key is released), the control unit 54 performs step S4. At step S4, the rounding processing unit 70 obtains the numerical value of the object to be rounded at that time point. For example, if the object to be rounded is "coordinate position", then the rounding processing unit 70 obtains from the coordinate position detecting unit 68 the coordinate position of the moved object 16 in the axial feed direction at the time when the axial feed operation was released. When step S4 is completed, the control unit 54 performs step S5.

FIG. 6 is a correspondence table showing an example of the relation between axial feed rates and rounding places that is stored in the memory of the control unit 54.

At step S5, the rounding processing unit 70 calculates the rounded numerical value by rounding the numerical value of the object to be rounded, to the rounding place. First, the rounding processing unit 70 refers to the correspondence relation between the axial feed rates and rounding places stored in the memory to thereby determine the rounding place corresponding to the axial feed rate that was already set at step S2. For example, suppose that the axial feed rates and the rounding places are in the correspondence relation shown in FIG. 6 and the axial feed rate specified by the operator is "superhigh". In this case, the rounding processing unit 70 determines that the rounding place is "the ones place" (in millimeters (mm)). The rounding place is thus determined in correspondence with the axial feed rate. Since the axial feed rate is already determined at the starting of the axial feed operation, the rounding processing unit 70 may determine the rounding place at the starting of the axial feed operation.

Subsequently, the rounding processing unit 70 calculates the rounded numerical value based on the rounding place thus determined. In this embodiment, the rounded numerical value is calculated by rounding up the numerical value of the object to be rounded, to the rounding place. For example, suppose that the operator intends to move the moved object 16 to the coordinate position "(X-axis direction) 200.0000 (mm)" but releases the operation key too early and consequently stops the moved object 16 at the coordinate position "(X-axis direction) 199.1234 (mm)". In this case, if the object to be rounded is "coordinate position" and the rounding place is "the ones place", then the rounding processing unit 70 calculates the rounded numerical value to be the value "200.0000 (mm)", and then completes step S5. After completing step S5, the control unit 54 performs step S6.

At step S6, the motor driving control unit 64 controls the motors 50X, 50Y based on the rounded numerical value calculated by the rounding processing unit 70. In the example above, the motor driving control unit 64 controls the motor 50X such that the "coordinate position" of the moved object 16 shifts from "199.1234 (mm)" to "200.0000 (mm)" in the X-axis direction. That is, after the axial feed operation has been released, the motor 50X is automatically driven so as to move the moved object 16 by "0.8766 (mm)" in the +X-axis direction.

The control unit 54 provides the control as described above when the rounding processing is conducted.

While the example above has shown a process in which "coordinate position" is rounded, the process proceeds in the same way when "the amount of movement" detected by the amount-of-movement detecting unit 66 is the target for the rounding processing. For example, suppose that the operator intends to move the moved object 16 by "200.0000 (mm)" in the +Y-axis direction but releases the operation key too early, and consequently the amount of movement results in "199.1234 (mm)". If the object to be rounded is "the amount of movement" and the rounding place is "the ones place", then the rounding processing unit 70 calculates the rounded numerical value to be "200.0000 (mm)". Then, the motor driving control unit 64 controls the motor 50Y such that the amount of movement of the moved object 16 in the +Y-axis direction becomes "200.0000 (mm)". That is, after the axial feed operation has been released, the motor 50Y is automatically driven so as to move the moved object 16 by "0.8766 (mm)" in the +Y-axis direction.

According to the control device 14 of the first embodiment described above, at least one of the coordinate position and the amount of movement of the moved object 16 is rounded to the rounding place. Then, even if variation occurs in the timing that the operator releases the operation key (i.e., stops the axial feed operation), variation in the stopping position and the amount of movement of the moved object 16 is suppressed.

Further, the rounding place is determined to be a higher-digit position as the axial feed rate specified by the operator is faster. In the axial feed operation, the error between the desired stopping position and the actual stopping position is likely to be larger as the axial feed rate is faster. However, according to the control device 14 of the first embodiment, the error between the desired stopping position and the actual stopping position of the moved object 16 can be rounded to a value corresponding to the axial feed rate.

Furthermore, in this embodiment, numerical values are rounded up to the rounding place to calculate the rounded numerical values. Consequently, even when moving based on the result of the rounding processing, the moved object 16 moves in the same direction as the axial feed direction instructed by the operator. That is, it is possible to prevent the moved object 16 from going back to a coordinate position that the moved object 16 once passed.

Modifications

The first embodiment has been described so far as an example of the present invention, and it is of course possible to apply various modifications or improvements to the first embodiment. It is clear from the recitation of claims that such variously modified or improved embodiments are included in the technical scope of the present invention.

First Modification

The rounding processing unit 70 may be configured to perform the rounding processing by rounding down to the rounding place at least one of the coordinate position and the amount of movement of the moved object 16 obtained at the time when the axial feed operation is stopped by the operator, in such a manner that the figures after the rounding place become zero.

A specific example will be explained. For example, suppose that an operator intends to move the moved object 16 to the coordinate position "(X-axis direction) 200.0000 (mm)" but releases the operation key too late and consequently stops the moved object 16 at the coordinate position "(X-axis direction) 200.1234 (mm)". In this case, if the object of the rounding processing is "coordinate position" and the rounding place is "the ones place", then the rounding processing unit 70 calculates the rounded numerical value to be "200.0000 (mm)". The motor driving control unit 64 then drives the motor 50X such that the coordinate position of the moved object 16 in the X-axis direction becomes "200.0000 (mm)". That is, after the axial feed operation has been released, the motor 50X is automatically driven so as to move the moved object 16 by "0.1234 (mm)" in the −X-axis direction.

In this case, when moving based on the result of the rounding processing, the moved object 16 moves in the opposite direction to the axial feed direction instructed by the operator. That is to say, this prevents the moved object 16 from advancing more than needed along the axial feed direction on the coordinate system.

Second Modification

The rounding processing unit 70 may be configured to perform the rounding processing by rounding in a round half up manner at least one of the coordinate position and the amount of movement of the moved object 16 obtained at the time when the axial feed operation is released by the operator, to the rounding place in such a manner that the figures after the rounding place become zero.

A specific example will be explained. For example, suppose that an operator intends to move the moved object 16 to the coordinate position "(Y-axis direction) 200.0000 (mm)" but releases the operation key too early and consequently stops the moved object 16 at the coordinate position "(Y-axis direction) 199.5678 (mm)". In this case, if the object of the rounding processing is "coordinate position" and the rounding place is "the ones place", then the rounding processing unit 70 calculates the rounded numerical value to be "200.0000 (mm)". The motor driving control unit 64 then controls the motor 50Y such that the coordinate position of the moved object 16 in the Y-axis direction becomes "200.0000 (mm)".

As another specific example, suppose that an operator intends to move the moved object 16 to the coordinate position "(Y-axis direction) 200.0000 (mm)" but releases the operation key too late and consequently stops the moved object 16 at the coordinate position "(Y-axis direction) 200.1234 (mm)". In this case, if the object of the rounding processing is "coordinate position" and the rounding place is "the ones place", then the rounding processing unit 70 calculates the rounded numerical value to be "200.0000 (mm)". The motor driving control unit 64 then controls the motor 50Y such that the coordinate position of the moved object 16 in the Y-axis direction becomes "200.0000 (mm)".

Thus, when the moved object 16 moves based on the result of the rounding processing, the amount of movement is likely to be further smaller.

Third Modification

A third modification explains an example in which, when the object to be rounded is "the amount of movement", the "amount of movement" is rounded by using numerical values of the "coordinate position" at the starting and the stopping of an axial feed operation.

The rounding processing unit 70 may be configured to round the amount of movement by adding the figures after the rounding place in the coordinate position of the moved object 16 in the axial feed direction at the time of the start of the axial feed operation, to the value of the coordinate position of the moved object 16 that has been rounded in such a manner that the figures after the rounding place become zero.

A specific example is explained. For example, at the time of the start of the axial feed operation, the rounding processing unit 70 stores information about the coordinate position of the moved object 16 at this time into the memory. Here, it is assumed that the axial feed operation has been done in the +X-axis direction and the information stored in the memory is "(X-axis direction) 0.1234 (mm)".

Next, at the time when the axial feed operation is stopped (i.e., the key is released), the rounding processing unit 70 obtains the coordinate position of the moved object 16 in the axial feed direction at this time. It is assumed here that the result obtained is "(X-axis direction) 199.2468 (mm)".

Next, the rounding processing unit 70 determines the rounding place and then rounds the coordinate position at the time point of releasing of the operation key. Here, it is assumed, as in the first embodiment, that the numerical value is rounded up to the rounding place. If the rounding place is "the ones place", the result is "200.0000 (mm)".

Next, the rounding processing unit 70 adds the figures after the rounding place of the coordinate position of the moved object 16 in the axial feed direction at the beginning of the axial feed operation, to the rounded numerical value of the coordinate position at the time of releasing of the operation key. That is, it adds "0.1234 (mm)" to "200.0000 (mm)" to obtain 200.1234 (mm)".

Then, the motor driving control unit 64 controls the motor 50X such that the coordinate position of the moved object 16 in the X-axis direction becomes "200.1234 (mm)". Thus, the moved object 16 moves in the X-axis direction just by "200.0000 (mm)" from the coordinate position at which the axial feed operation started.

In this way, the rounding processing unit 70 may be configured to perform the processing in which "the amount of movement" is rounded by using numerical values of the "coordinate position". Then, even if the timing that the operator releases the operation key varies, variation in the amount of movement of the moved object 16 is suppressed.

Fourth Modification

The rounding processing unit 70 may be configured to perform the rounding processing for rounding the amount of movement by subtracting the figures after the rounding place in the amount of movement of the moved object 16 at the time point of releasing of the operation key (i.e., at the time of stopping of the axial feed operation), from the value of the coordinate position of the moved object 16 at the time point of releasing of the operation key.

A specific example will be explained. For example, at the time when an axial feed operation starting at the coordinate position "(X-axis direction) 0.2468 (mm)" is stopped, the rounding processing unit 70 obtains the coordinate position and the amount of movement of the moved object 16 in the axial feed direction at this time. It is assumed here that the coordinate position obtained is "(X-axis direction) 199.1234 (mm)" and the amount of movement obtained is "(X-axis direction) 198.8766 (mm)". The amount of movement obtained at this time may be detected by the amount-of-movement detecting unit 66, or may be calculated by the rounding processing unit 70 based on the difference between the coordinate position at which the axial feed operation was started and the coordinate position at which the axial feed operation was stopped.

Next, the rounding processing unit 70 determines the rounding place and then subtracts the figures after the rounding place in the amount of movement of the moved object 16 at the time point of stopping of the axial feed operation, from the value of the coordinate position of the moved object 16 at the time point of stopping of the axial feed operation. If the rounding place is "the ones place", then the rounding processing unit 70 subtracts "0.8766 (mm)" from "199.1234 (mm)" to obtain "198.2468 (mm)".

Then, the motor driving control unit 64 controls the motor 50X such that the coordinate position of the moved object 16 in the X-axis direction becomes "198.2468 (mm)". The moved object 16 is thus moved in the X-axis direction just by "198.0000 (mm)" from the coordinate position at which the axial feed operation started.

The rounding processing unit 70 may be configured to perform the processing for rounding the "amount of movement" as described above. This suppresses variation in the amount of movement of the moved object 16 even when the timing that the operator releases the operation key varies.

Fifth Modification

The target for the above-described rounding processing and the control based on the rounding result is not limited to the supporting portion 44. For example, the control device 14 may be configured to perform the rounding processing when the upper wire guide 32 is axially fed along any of the V-axis, U-axis and Z-axis and to move the upper wire guide 32 based on the result. Further, the lower wire guide 34 may be controlled in the same manner as the upper wire guide 32.

Sixth Modification

The machine tool 10 to which the control device 14 is applied is not limited to wire electric discharge machines as long as the machine tools are equipped with axial feed operation. For example, the machine tool 10 may be an injection molding machine and the control device 14 may perform the rounding processing when an object 16 to be moved is axially fed in the injection molding machine.

Seventh Modification

The embodiment and modifications described above may be combined together in an arbitrary manner within ranges where no contradiction occurs.

Invention Obtained from Embodiments

The invention that can be grasped from the embodiments and modifications above will be recited below.

First Invention

According to a first invention, the control device (14) configured to control a motor (50X, 50Y) for performing axial feed of a moved object (16) includes: an input unit (52) configured to allow an operator to perform an axial feed operation and specify an axial feed rate; a motor driving control unit (64) configured to drive the motor (50X, 50Y) such that the moved object (16) moves at the specified axial feed rate only while the axial feed operation is being performed by the operator; an amount-of-movement detecting unit (66) configured to detect an amount of movement of the moved object (16) in an axial feed direction; a coordinate position detecting unit (68) configured to detect, based on the amount of movement, a coordinate position of the moved object (16) in the axial feed direction on a predetermined coordinate system; a display unit (56) configured to display at least the coordinate position; and a rounding processing unit (70) configured to perform rounding processing for rounding, to a rounding place corresponding to the specified axial feed rate, at least one of the coordinate position and the amount of movement of the moved object (16) at a time when the axial feed operation is stopped by the operator, wherein the motor driving control unit (64) is further configured to drive the motor (50X, 50Y) such that at least one of the coordinate position and the amount of movement of the moved object (16) is rounded based on a result of the rounding processing.

Thus, even if the timing that the operator releases the axial feed key (i.e., stops the axial feed operation) varies, variation in the stopping position and the amount of movement of the moved object (16) is suppressed.

The rounding processing unit (70) may be configured to perform the rounding processing by rounding up at least one of the coordinate position and the amount of movement of the moved object (16) at the time when the axial feed operation is stopped by the operator, to the rounding place such that figures after the rounding place become zero. Thus, even when moving based on the result of the rounding processing, the moved object (16) moves in the same direction as the axial feed direction instructed by the operator. That is, the moved object (16) is prevented from going back to a coordinate position that it once passed.

The rounding processing unit (70) may be configured to perform the rounding processing by rounding down at least one of the coordinate position and the amount of movement of the moved object (16) at the time when the axial feed operation is stopped by the operator, to the rounding place such that figures after the rounding place become zero. Thus, when moving based on the result of the rounding processing, the moved object (16) moves in the opposite direction to the axial feed direction instructed by the operator. That is, the moved object (16) is prevented from advancing more than needed in the axial feed direction on the coordinate system.

The rounding processing unit (70) may be configured to perform the rounding processing by rounding in a round half up manner at least one of the coordinate position and the amount of movement of the moved object (16) at the time when the axial feed operation is stopped by the operator, to the rounding place such that figures after the rounding place become zero. Thus, when moving based on the result of the rounding processing, the moved object (16) is likely to travel a further smaller amount of movement.

The rounding processing unit (70) may be configured to perform the rounding processing for rounding the amount of movement by adding figures after the rounding place of the coordinate position of the moved object (16) in the axial feed direction at a time when the axial feed operation was started, to a value obtained by rounding the coordinate position of the moved object (16) such that figures after the rounding place become zero. Thus, even if the timing that the operator releases the axial feed operation varies, variation in the amount of movement of the moved object (16) is suppressed.

The rounding processing unit (70) may be configured to perform the rounding processing for rounding the amount of movement by subtracting figures after the rounding place in the amount of movement of the moved object (16) at the time when the axial feed operation is stopped, from a value of the coordinate position of the moved object (16) at the time when the axial feed operation is stopped. Thus, even if the timing that the operator stops the axial feed operation varies, variation in the amount of movement of the moved object (16) is suppressed.

Second Invention

According to a second invention, an axial feed control method includes the steps of: setting either of a coordinate position and an amount of movement of a moved object (16) as an object of rounding processing; in accordance with specifying of an axial feed rate and performing of an axial feed operation by an operator, driving a motor (50X, 50Y) such that the moved object (16) moves on a coordinate system at the specified axial feed rate; at a time when the axial feed operation is stopped, obtaining a numerical value of the object of the rounding processing at that time; determining a rounding place corresponding to the axial feed rate based on a predetermined correspondence relation; calculating a rounded numerical value by performing the rounding processing for rounding the numerical value of the object of the rounding processing to the rounding place; and driving the motor (50X, 50Y) such that an actual numerical value of the object of the rounding processing agrees with the rounded numerical value.

Thus, even if the timing that the operator releases the axial feed key (i.e., stops the axial feed operation) varies, variation in the stopping position and the amount of movement of the moved object (16) is suppressed.

In the rounding processing, the rounded numerical value may be calculated by rounding up the numerical value of the object of the rounding processing at the time when the axial feed operation is stopped by the operator, to the rounding place such that figures after the rounding place become zero. Thus, even when moving based on the result of the rounding processing, the moved object (16) moves in the same direction as the axial feed direction instructed by the operator. That is, the moved object (16) is prevented from going back to a coordinate position that it once passed.

In the rounding processing, the rounded numerical value may be calculated by rounding down the numerical value of the object of the rounding processing at the time when the axial feed operation is stopped by the operator, to the rounding place such that figures after the rounding place become zero. Thus, when moving based on the result of the rounding processing, the moved object (16) moves in the opposite direction to the axial feed direction instructed by the operator. That is, the moved object (16) is prevented from advancing more than needed in the axial feed direction on the coordinate system.

In the rounding processing, the rounded numerical value may be calculated by rounding in a round half up manner the numerical value of the object of the rounding processing at the time when the axial feed operation is stopped by the operator, to the rounding place such that figures after the rounding place become zero. Thus, when moving based on the result of the rounding processing, the moved object (16) is likely to travel a further smaller amount of movement.

In the rounding processing, the amount of movement may be rounded by adding figures after the rounding place of the coordinate position of the moved object (16) in the axial feed direction at a time when the axial feed operation was started, to a value obtained by rounding the coordinate position of the moved object (16) such that figures after the rounding place become zero. Thus, even if the timing that the operator releases the axial feed operation varies, variation in the amount of movement of the moved object (16) is suppressed.

In the rounding processing, the amount of movement may be rounded by subtracting figures after the rounding place in the amount of movement of the moved object (16) at the time when the axial feed operation is stopped, from a value of the coordinate position of the moved object (16) at the time when the axial feed operation is stopped. Thus, even if the timing that the operator stops the axial feed operation varies, variation in the amount of movement of the moved object (16) is suppressed.

The present invention is not particularly limited to the embodiment described above, and various modifications are possible without departing from the essence and gist of the present invention.

What is claimed is:

1. A control device configured to control a motor for performing axial feed of a moved object, comprising:
   an operation panel configured to allow an operator to perform an axial feed operation and specify an axial feed rate;
   a processor configured to:
   drive the motor so that the moved object moves at the specified axial feed rate only while the axial feed operation is being performed by the operator;
   detect an amount of movement of the moved object in an axial feed direction; and
   detect, based on the amount of movement, a coordinate position of the moved object in the axial feed direction on a predetermined coordinate system; and
   a display unit configured to display at least the coordinate position; and
   the processor being further configured to:
   perform rounding processing for rounding, to a rounding place corresponding to the specified axial feed rate, at least one of the coordinate position or the amount of movement of the moved object at a time when the axial feed operation is stopped by the operator; and
   drive the motor so that at least one of the coordinate position or the amount of movement of the moved object is rounded based on a result of the rounding processing.

2. The control device according to claim 1, wherein the processor is further configured to perform the rounding processing by rounding up at least one of the coordinate position or the amount of movement of the moved object at the time when the axial feed operation is stopped by the operator, to the rounding place so that figures after the rounding place become zero.

3. The control device according to claim 1, wherein the processor is further configured to perform the rounding processing by rounding down at least one of the coordinate position or the amount of movement of the moved object at the time when the axial feed operation is stopped by the operator, to the rounding place so that figures after the rounding place become zero.

4. The control device according to claim 1, wherein the processor is further configured to perform the rounding processing by rounding in a round half up manner at least one of the coordinate position or the amount of movement of the moved object at the time when the axial feed operation is stopped by the operator, to the rounding place so that figures after the rounding place become zero.

5. The control device according to claim 1, wherein the processor is further configured to perform the rounding processing for rounding the amount of movement by adding figures after the rounding place of the coordinate position of the moved object in the axial feed direction at a time when the axial feed operation was started, to a value obtained by rounding the coordinate position of the moved object so that figures after the rounding place become zero.

6. The control device according to claim 1, wherein the processor is further configured to perform the rounding processing for rounding the amount of movement by subtracting figures after the rounding place in the amount of movement of the moved object at the time when the axial feed operation is stopped, from a value of the coordinate position of the moved object at the time when the axial feed operation is stopped.

7. An axial feed control method comprising the steps of:
   setting either of a coordinate position or an amount of movement of a moved object as an object of rounding processing;
   in accordance with specifying of an axial feed rate and performing of an axial feed operation by an operator, driving a motor so that the moved object moves on a coordinate system at the specified axial feed rate;
   at a time when the axial feed operation is stopped, obtaining a numerical value of the object of the rounding processing at that time;
   determining a rounding place corresponding to the axial feed rate based on a predetermined correspondence relation;
   calculating a rounded numerical value by performing the rounding processing for rounding the numerical value of the object of the rounding processing to the rounding place; and
   driving the motor so that an actual numerical value of the object of the rounding processing agrees with the rounded numerical value.

8. The axial feed control method according to claim 7, wherein, in the rounding processing, the rounded numerical value is calculated by rounding up the numerical value of the object of the rounding processing at the time when the axial feed operation is stopped by the operator, to the rounding place so that figures after the rounding place become zero.

9. The axial feed control method according to claim 7, wherein, in the rounding processing, the rounded numerical value is calculated by rounding down the numerical value of the object of the rounding processing at the time when the axial feed operation is stopped by the operator, to the rounding place so that figures after the rounding place become zero.

10. The axial feed control method according to claim 7, wherein, in the rounding processing, the rounded numerical value is calculated by rounding in a round half up manner the numerical value of the object of the rounding processing at the time when the axial feed operation is stopped by the operator, to the rounding place so that figures after the rounding place become zero.

11. The axial feed control method according to claim 7, wherein, in the rounding processing, the amount of movement is rounded by adding figures after the rounding place of the coordinate position of the moved object in the axial feed direction at a time when the axial feed operation was started, to a value obtained by rounding the coordinate position of the moved object so that figures after the rounding place become zero.

12. The axial feed control method according to claim 7, wherein, in the rounding processing, the amount of movement is rounded by subtracting figures after the rounding place in the amount of movement of the moved object at the time when the axial feed operation is stopped, from a value of the coordinate position of the moved object at the time when the axial feed operation is stopped.

* * * * *